(No Model.)

A. PERKINS.
CYCLE WHEEL ADJUSTMENT.

No. 547,523. Patented Oct. 8, 1895.

Witnesses:
Harry B. Rohrer
Denis J. Downing

Inventor:
Albert Perkins
By Niles & Green
Attys.

UNITED STATES PATENT OFFICE.

ALBERT PERKINS, OF CHICOPEE, MASSACHUSETTS, ASSIGNOR TO THE LAMB MANUFACTURING COMPANY, OF SAME PLACE.

CYCLE-WHEEL ADJUSTMENT.

SPECIFICATION forming part of Letters Patent No. 547,523, dated October 8, 1895.

Application filed December 22, 1893. Serial No. 494,428. (No model.)

*To all whom it may concern:*

Be it known that I, ALBERT PERKINS, a citizen of the United States, residing at Chicopee, in the county of Hampden and State of Massachusetts, have invented new and useful Improvements in Cycle-Wheel Adjustment, of which the following is a specification.

The invention relates to such adjustment of the wheel as is commonly required in regulating the slack in the chain and in giving the plane of the wheel the same general direction as the central plane of the machine. It is very desirable that such adjustment should be readily made, that the range of adjustment should be great enough to compensate for any probable wear or stretching of parts, and that the adjusting means should be simple, secure, strong, durable, and without inconvenient or unsightly projecting parts. To secure these ends, while reducing the usual cost of manufacture, is the object of this invention.

Figure 1:
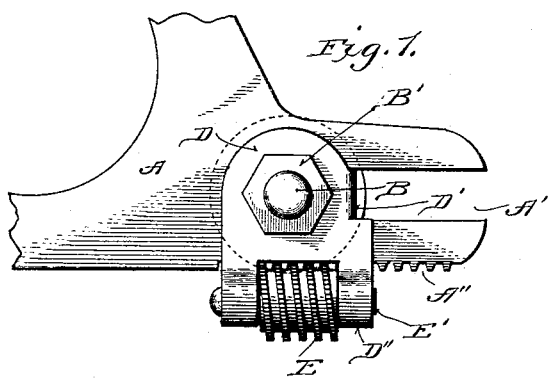
Figure 2:
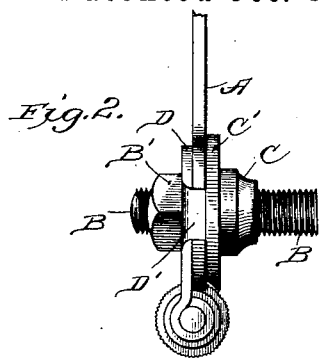
Figure 3:
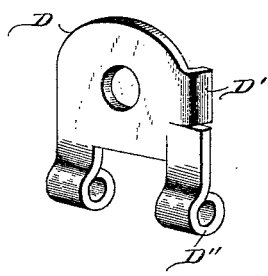
Figure 4:
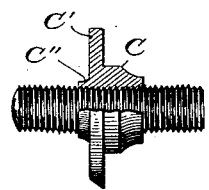
Figure 5:
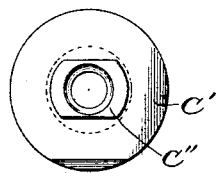
Figure 6:
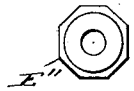

In the drawings, Figure 1 shows in side elevation one of the two similar bifurcated axle-receiving plates forming part of the frame of the machine, the axle and some immediately adjacent parts being in position. Fig. 2 is a rear end view of the same parts. Figs. 3, 4, and 5 are detail views. Fig. 6 illustrates a slight modification of construction.

In the figures, A is an axle-receiving plate formed integrally with or rigidly attached to the frame of the machine and provided with a slot A' to receive an axle B. The latter is threaded, as usual, and upon it is screwed a bearing-cone C, having at its outer end a broad flange C', the whole forming a stop against which the plate A rests. Upon the opposite side of the plate A is a plate D, centrally perforated to slide freely upon the axle and provided with an inwardly-bent lip D', filling the slot A', to close the passage toward the axle and to prevent the rotation of the plate about the same. The plate D extends below the plate A and its lower part is bent to form a tubular bearing for the shaft E' of a worm-gear E, which lies in a recess formed by cutting away the middle portion of the bearing D". The worm-gear rotates freely in its bearing, and its threads, which are preferably milled externally to facilitate turning it, engage with a rack A", formed upon the plate A, substantially parallel to the direction of the slot A'. Upon the outer end of the axle is screwed a nut B', which clamps both plates between itself and the stop C, which when in place is prevented from changing its adjustment by a projection C" upon its inner face fitting the slot A'. Now if the nut B' be slightly loosened, so that the plates are no longer clamped, the worm-gear may be readily rotated in either direction, causing it to advance in either direction along the rack, carrying the plate D and with it the corresponding end of the axle. As both ends of the axle are provided with the adjusting devices, it follows that if both worm-gears be rotated the wheel will be carried bodily rearward or forward with reference to the frame, and that if one only be rotated, the axle will be swung about a point near one of its ends, adjusting the plane of the wheel. Evidently if the axle bears a sprocket-wheel carrying a chain bodily movement of the wheel adjusts its tension or the slack is increased or lessened. If the chain be separated at one point, as it usually may be, or if it be first slacked and removed from the front sprocket-wheel the rear wheel may be quickly detached from the frame by rotating both worm-gears until the axle passes out at the rear open end of the slot A', and by reversing the operation it may be as readily replaced. In thus removing and replacing the wheel the adjustments are not disturbed, it being only necessary to loosen the nuts B' by half a turn and restore them to the original position when the wheel has been replaced. When they are screwed firmly against the plates D, the worm-gears cannot be rotated, and hence accidental change of adjustment is impossible. Instead of having their threads externally milled, the worm-gears may be made polygonal, as suggested in Fig. 6, whereby they are adapted to be rotated either with the fingers or with a wrench should serious accident to the machine cause bending of the parts.

It is evident that the construction may be varied in other ways without passing beyond the limits of the invention. I have shown plates A as rear terminations of the rear fork of the frame, and have shown these as bifurcated, and have shown the rack as at the lower edge of the frame member, and also as integral therewith; but though all these features are deemed important none is quite indispensable.

What I claim is—

The combination with the plates having the rearwardly open axle-receiving slots and the racks at their lower sides, of the threaded transverse axle, a stop upon said axle, the plate, upon the opposite side of the axle-receiving plate, bearing the worm gears engaging the racks, respectively, and nuts upon the outer ends of the axle clamping the plates between the nuts and said stops.

ALBERT PERKINS.

Witnesses:
ALBERT B. BARSTMAN,
HENRY N. LYON.